United States Patent
Fujii et al.

(10) Patent No.: US 11,110,542 B2
(45) Date of Patent: Sep. 7, 2021

(54) FRICTION PRESSURE WELDING METHOD

(71) Applicant: OSAKA UNIVERSITY, Suita (JP)

(72) Inventors: Hidetoshi Fujii, Suita (JP); Yoshiaki Morisada, Suita (JP); Yasuhiro Aoki, Suita (JP)

(73) Assignee: OSAKA UNIVERSITY, Suita (JP)

( * ) Notice: Subject to any disclaimer, the term of this patent is extended or adjusted under 35 U.S.C. 154(b) by 146 days.

(21) Appl. No.: 16/494,916

(22) PCT Filed: Mar. 9, 2018

(86) PCT No.: PCT/JP2018/009202
§ 371 (c)(1),
(2) Date: Sep. 17, 2019

(87) PCT Pub. No.: WO2018/168687
PCT Pub. Date: Sep. 20, 2018

(65) Prior Publication Data
US 2020/0023458 A1    Jan. 23, 2020

(30) Foreign Application Priority Data

Mar. 17, 2017   (JP) .............................. JP2017-053547

(51) Int. Cl.
  *B23K 20/00*   (2006.01)
  *B23K 20/12*   (2006.01)
  (Continued)

(52) U.S. Cl.
  CPC ........ *B23K 20/121* (2013.01); *B23K 2101/20* (2018.08); *B23K 2103/04* (2018.08)

(58) Field of Classification Search
  CPC .. B23K 20/1255; B23K 20/12; B23K 20/122; B23K 20/129; B23K 2101/006;
  (Continued)

(56) References Cited

U.S. PATENT DOCUMENTS

| | | | | |
|---|---|---|---|---|
| 8,578,992 | B2 * | 11/2013 | Kawaura | B23K 20/12 156/358 |
| 2006/0054666 | A1 * | 3/2006 | Ehrstrom | B23K 20/122 228/227 |
| 2020/0023458 | A1 * | 1/2020 | Fujii | B23K 20/121 |

FOREIGN PATENT DOCUMENTS

| | | |
|---|---|---|
| JP | 52-56360 A | 5/1977 |
| JP | 60-87986 A | 5/1985 |

(Continued)

OTHER PUBLICATIONS

International Search Report dated May 29, 2018, issued in counterpart International Application No. PCT/JP2018/009202 (2 pages).

*Primary Examiner* — Erin B Saad
(74) *Attorney, Agent, or Firm* — Westerman, Hattori, Daniels & Adrian, LLP

(57) ABSTRACT

The present invention provides a friction welding method capable of reducing the welding temperature and a friction welding method capable of obtaining a welded portion free of defects regardless the type of material. A frictional welding method in which one member is brought into contact with the other member and slides while a load is applied substantially perpendicularly to the interface to be welded, the frictional welding method comprising: a first step in which frictional welding is carried out by setting a pressure calculated from the area and the load of the interface to be welded to be equal to or higher than the yield stress and the tensile strength of one member and/or the other member at a desired welding temperature; and a second step in which frictional welding is carried out by lowering the load, wherein the first step and the second step are continuously carried out.

10 Claims, 19 Drawing Sheets

(51) Int. Cl.
*B23K 101/20* (2006.01)
*B23K 103/04* (2006.01)

(58) Field of Classification Search
CPC .......................... B23K 2103/04; B23K 28/02; B23K 20/1225; B23K 20/128; B23K 2101/20; B23K 2103/10; B23K 20/121; B23K 20/1235; B23K 2103/02; B23K 9/173; B23K 20/1245; B23K 20/126; B23K 20/1265; B23K 20/14; B23K 20/22; B23K 20/227; B23K 20/233; B23K 2103/05; B23K 2103/08; B23K 2103/14; B23K 2103/18; B23K 31/12; B23K 31/125; B23K 37/003; B23K 20/1205; B23K 20/125; B23K 20/127; B23K 20/1275; B23K 2101/06; B23K 2101/34; B23K 26/14; B23K 26/144; B23K 26/1476; B23K 26/342; B23K 31/025; B23K 35/0244; B23K 35/327
See application file for complete search history.

(56) References Cited

FOREIGN PATENT DOCUMENTS

| | | |
|---|---|---|
| JP | 2001-287051 A | 10/2001 |
| JP | 2002-294404 A | 10/2002 |
| WO | 2017/022184 A1 | 2/2017 |

\* cited by examiner

FRICTION PRESSURE WELDING METHOD

TECHNICAL FIELD

The present invention relates to a friction welding method of a metal material, and more particularly, to a friction welding method capable of accurately controlling a welding temperature, and to a friction welding method capable of obtaining a welding portion free of defects regardless of the type of a material to be welded, and to a welding structure obtained thereby.

THE BACKGROUND OF THE INVENTION

In recent years, a solid phase welding (welding by friction technique) method using a friction heat generation phenomenon has attracted attention as a welding method capable of reducing the strength reduction of a welding portion compared with conventional melt welding. Typical solid phase welding methods include "friction stir welding (FSW)" in which a cylindrical tool rotating at high speed is press-fitted into a material to be welded, and "friction welding" in which a cylindrical material to be welded is pressed by abutting against a fixed material to be welded, and the like.

Especially, kinds and combinations of materials to be welded, which are objects of friction welding requiring no tools, are diverse, and research and development have been actively carried out on steel, which is a general-purpose structural material. For example, Japanese Patent Application Laid-Open No. 2001-287051 proposes a method of providing a friction welding joint of a high tensile strength steel material in which the hardness is substantially uniform over the rotation radial direction of the friction welding.

The friction welding joint of the high tensile strength steel material described in Patent Document 1 is a friction welding joint of a high tensile strength steel material having a microstructure with a grain diameter of 2 µm or less, a tensile strength of 60 kgf/mm$^2$ or more, and a carbon content of 0.1 wt % or less, and the carbon content of the high tensile strength steel material is suppressed to as low as 0.1 wt %. With this low carbon content of 0.1 wt % or less, the outer peripheral portion of the high tensile strength steel material is restrained from changing its structure and hardening is restrained at the time of friction welding.

Patent Document 2 (Japanese Patent Application Laid-Open No. 2002-294404) provides a high carbon steel material suitable for friction welding and a method of manufacturing the same, in which the increase in hardness of the friction welding joint is small.

The member (steel material) to be frictionally welded is subjected to an extremely rapid heating and cooling cycle in which the member (steel material) is rapidly heated to a temperature just below the melting point under a high pressure in about 10 seconds and then rapidly cooled from 1200° C. or more. Therefore, the crystal grains of the member are coarsened at the time of rapid heating, and are transformed into a hard martensite phase by rapid cooling thereafter, thereby increasing the hardness of the joint portion.

On the other hand, in the high carbon steel material described in Patent Document 2, the coarsening of austenite crystal grains of the high carbon steel material is prevented by containing 0.005% or more of Nb in a solid solution state, the austenite grain size number measured after heat treatment at 800° C. for 5 minutes by an oxidizing method according to the JIS G 0551 regulation can be set to 9 or more, and the increase in hardness of the friction-welding joint can be suppressed.

PRIOR-ART DOCUMENT

Patent Document

[Patent Document 1] Japanese Unexamined Patent Application Publication No. 2001-287051
[Patent Document 2] Japanese Unexamined Patent Application Publication No. 2002-294404

SUMMARY OF THE INVENTION

Problem to be Solved by the Invention

However, it is essential that the friction welding joint disclosed in Patent Document 1 has a high tensile strength steel material having a carbon content of 0.1 wt % or less, and the material to be welded is limited to an extremely narrow range.

Also in the friction welding joint disclosed in Patent Document 2, the composition of a steel material that can be used as a welded material is limited. In addition, it is not possible to effectively suppress a decrease in hardness (strength) in the heat affected zone. In particular, it is difficult to control joint characteristics in friction welding in which materials to be welded are slid. Here, the welding temperature at the time of friction welding greatly influences the mechanical properties of the welding portion, and the mechanical properties of the welding portion can be improved if the welding temperature can be lowered, but the welding temperature cannot be accurately controlled by the friction welding method disclosed in Patent Documents 1 and 2.

In view of the above-mentioned problems in the prior art, an object of the present invention is to provide a friction welding method capable of accurately controlling the welding temperature as well as lowering the welding temperature, and a friction welding method capable of obtaining a welded portion free of defects regardless of the type of the material to be welded, and a welded structure obtained by the friction welding method.

Means to Solve the Problems

As a result of intensive research on the friction welding conditions in order to achieve the above object, the present inventor has found that it is extremely effective to control the welding temperature and the distribution thereof by the pressure applied to the interface to be welded, and has reached the present invention.

That is, the present invention provides a friction welding method, in which one member is brought into contact with the other member and slides in a state that a load is applied substantially perpendicularly to an interface to be welded, comprising;
a first step of performing friction welding by setting the pressure ($P_1$) calculated from the area of the interface to be welded and the load to be equal to or higher than the yield stress of the one member and/or the other member and equal to or lower than the tensile strength at a desired welding temperature,
a second of performing friction welding by lowering the load, wherein the first step and the second step are carried out continuously.

In the friction welding method of the present invention, the basic welding temperature can be determined in the first step. When frictional heat is generated by sliding between the members to be welded by friction welding, it is generally considered that the amount of heat generated increases as the applied pressure increases, and the welding temperature increases. However, when the present inventors carried out intensive studies, a phenomenon was observed in which the temperature in the vicinity of the welding interface (so-called "welding temperature") decreased with an increase in the applied pressure.

More specifically, although the frictional heat increases when the applied pressure of the friction welding is increased, since the softened material is continuously discharged as a flash, the "welding temperature" is determined by the pressure applied to the softened material (the force for discharging a flash or burr). That is, when the applied pressure is set to be high, the welded material having a higher strength (a state in which the yield strength is high) can be discharged as a flash or burr. Here, the "higher yield strength state" means a "lower temperature state", and therefore, the "welding temperature" is lowered by an increase in the applied pressure. Since the relationship between the yield strength and the temperature is substantially constant depending on the material, it is possible to control the welding temperature extremely accurately as compared with the case of using the frictional heat.

That is, in the present invention, the welding temperature can be controlled by setting the pressure at the time of the friction welding to be equal to or higher than the yield stress and equal to or lower than the tensile strength of one member and/or the other member at a desired welding temperature. Of course, the present invention does not exclude that the pressure actually applied becomes larger than the tensile strength when the pressure at the time of friction welding is set to be equal to or higher than the yield stress of one member and/or the other member and equal to or lower than the tensile strength at the desired welding temperature. Here, the discharge of the flash from the interface to be welded is started by setting the pressure at the time of the friction pressure welding to be equal to or higher than the yield stress of the material to be welded, and the discharge of the flash or burr is accelerated by increasing the pressure up to the tensile strength. Like the yield stress, since the tensile strength at a specific temperature is also substantially constant depending on the material to be welded, the welding temperature corresponding to the set pressure can be realized.

Further, in the friction welding method of the present invention, the welding temperature can be made uniform in the whole area of the interface to be welded (particularly in the center portion of the interface to be welded) in the second step, and the formation of the unwelded portion can be effectively suppressed. For example, in the friction welding, the peripheral speed increases on the outer peripheral side of the member to be welded, and the amount of friction heat generation increases as compared with the center portion. As a result, softening progresses in the vicinity of the outer periphery of the interface to be welded, and it becomes difficult to support the applied load. That is, the area of the interface to be welded supporting the load is reduced, and the pressure actually applied to the center portion of the interface to be welded becomes larger than the set value. As described above, since the increase of the applied pressure lowers the welding temperature, in particular, when the desired welding temperature is low, when the deformation resistance of the material to be welded is large, and when the heat conduction at the interface to be welded does not proceed quickly, an unwelded portion is formed at the center of the welding interface.

In contrast, by reducing the load applied to the interface to be welded in the second step, the welding temperature can be increased. By raising the temperature of the central portion of the interface to be welded to a level that enables welding by the second step, a good friction-welded joint in which no unwelded portion exists can be obtained. In general friction welding, the applied pressure is increased in the final step (upsetting step) of welding, but in the friction welding method of the present invention, it is possible to realize equalization or uniformity of the welding temperature at the interface to be welded by passing through completely different (reversed) steps. The transition from the first step to the second step may be carried out gradually or abruptly.

Here, in general friction welding, the load factor of the motor for rotating the member to be welded exhibits a maximum value immediately after the start of welding, and then becomes a steady state until immediately before the stop of rotation, and increases for a short time at the stop of rotation immediately after the set deviation is achieved. On the other hand, when the friction welding method of the present invention is used to join a material having a low thermal conductivity under a low temperature condition (a welding condition of a low rotation speed and a high load), the load factor of the motor increases after the steady state continues at the initial stage of welding and immediately before the set deviation is achieved. The increase in the motor load factor is considered to occur in the process of forming an unwelded portion in the welded central portion, and the friction pressure is decreased (shifted to the second step) at the timing at which the motor load factor starts to increase, whereby the temperature distribution at the interface to be welded can be made uniform. The transition to the second step at this timing is preferably applied, for example, when the welding temperature is set to be equal to or lower than the $A_1$ temperature of the steel or when the β transus temperature of the titanium alloy is set to be equal to or lower than the β transus temperature of the titanium alloy.

In the friction welding process, in the second step, it is preferable that a true pressure ($P_2$) is calculated by subtracting a softened region of the welding interface due to an increase in temperatures from the area, and the load is reduced so that the pressure ($P_1$) and the true pressure ($P_2$) are substantially the same value. Further, it is more preferable to gradually reduce the load in accordance with the softened region which increases per minute time. As a method of estimating the increase of the softened region, there can be mentioned a method of measuring the rotational torque during welding or the temperature of the outer edge of the welded region. More specifically, as the softened region increases, the rotational torque decreases, and the welding temperature tends to increase.

The softening region means a region in which plastic deformation is caused by the pressure ($P_1$) in the temperature-distributed state of the interface to be welded at the time of shifting from the first step to the second step. The softened region can be determined by observing the state of the interface to be welded after the first step, but when the determination of the softened region by observing the interface to be welded is omitted, the softened region is set to preferably 10 to 50%, more preferably 15 to 20% of the area of the interface to be welded. By calculating the true pressure ($P_2$) by setting the softened area to 10 to 50% of the area of the interface to be welded, it is possible to effectively suppress the formation of an unwelded portion in the center portion of the interface to be welded.

In the friction welding method of the present invention, it is preferable to set the pressure ($P_1$) at the time of friction welding to the yield stresses of one member and/or the other member at the desired welding temperatures. In the friction welding, the discharge of the flash is started at the moment when the pressure reaches the yield stress, and the desired welding temperature can be more accurately realized as compared with the case where the pressure is set to a higher value (with the tensile strength as an upper limit).

In the friction welding method of the present invention, it is preferable that the one member and/or the other member be made of an iron-based metal. Since the iron-based metal has mechanical properties that can withstand the welding process of friction welding, deformation or the like at an unnecessary place during the welding process can be prevented by using the iron-based metal as the material to be welded. In addition, the friction welding is a solid-phase welding, and it is possible to suppress the deterioration of the mechanical properties of the welding portion which is remarkably observed in the general fusion welding. In the present invention, the iron-based metal means a metal mainly containing iron in composition, and includes, for example, various steels, cast iron, and the like.

In addition, in the friction press method of the present invention, it is more desirable that the member of the first and/or the member of the other be high-speed tool steel. In addition to the high deformation resistance, high-speed tool steel contains a large amount of alloying elements, so that the thermal conductivity is low, and it is relatively difficult to make uniform the welding temperature at the interface to be welded. In contrast, in the friction welding method of the present invention, a sufficient welding temperature can be applied to the center portion of the interface to be welded in the second step, and the formation of the unwelded portion can be suppressed. The thermal conductivity of iron at 20° C. is 72 7 W m·K, whereas that of SKH51, which is a typical high-speed tool steel, is 30 0 W m·K. In addition, the thermal conductivity of SUS304 is as low as 16.0 7 W m·K. and the inventive frictional welding process can be suitably used to effect welding.

In the friction welding process, it is preferable to set the welding temperature to a temperature not higher than the $A_1$ temperature of the iron-based metal used as the material to be welded. In iron-based metals, brittle martensite is formed by phase transformation, and there are cases in which welding is difficult and in which a welding portion is embrittled. On the other hand, by setting the welding temperature to the $A_1$ temperature or lower by the friction welding method of the present invention, phase transformation does not occur, and therefore, the brittle martensite can be completely suppressed from being formed.

In a typical frictional welding, the maximum attainable temperatures during welding are higher than the $A_3$ temperature or the $A_{c\,m}$ temperature of the iron-based material which is the material to be welded. In particular, conventional frictional welding is a technique for achieving welding by discharging an oxide film or the like on a surface to be welded together with a flash, and the welding temperature needs to be higher than the $A_3$ temperature or the $A_{c\,m}$ temperature (the welding temperature needs to be sufficiently softened (the structure of the welding portion is made austenite)) in order to discharge a sufficient quantity of burr.

On the other hand, in the friction welding process of the present embodiment, the maximum reaching temperature can be set to be equal to or lower than the $A_1$ temperature of the iron-based material, and if the maximum reaching temperature during the welding process is equal to or lower than the $A_1$ temperature of the iron-based material to be welded, transformation does not occur in the welding portion, and martensite is not formed. In addition, since the welding is achieved at a lower temperature as compared with the conventional friction welding, the formation of the heat affected zone can be suppressed. As a result, regardless of the composition of the iron-based material, it is possible to suppress an increase in the hardness of the joint and a decrease in the hardness (strength) of the heat affected zone.

Further, in the friction welding method of the present invention, it is preferable to use both friction heat caused by sliding between the metallic members to be welded and processing heat generated by plastic deformation of the metallic members to be welded. Conventional friction welding is a welding method using friction heat, but a good joint can be obtained even at a low welding temperature by actively utilizing processing heat generated due to plastic deformation of a metal member to be welded.

Further, in the friction welding method of the present invention, the welding pressure is higher and the rotational speed is extremely low (e.g., less than 400 rpm) as compared with the conventional friction welding method, whereby the welding temperature can be made to be equal to or lower than the $A_1$ temperature of the iron-based material which is the material to be welded. In addition, it is possible to generate processing heat due to plastic deformation of the metal member to be welded, and it is possible to obtain a good joint even at a low welding temperature. The rotation speed used in general frictional welding is several thousand rpm, which is a numerical range completely different from the rotation speed used in the frictional welding of the present invention.

In the method of the present invention, it is preferable that the one member and/or the other member is made of titanium or a titanium alloy. Since titanium or a titanium alloy has mechanical properties that can withstand the welding process of friction welding, deformation or the like at an unnecessary place during the welding process can be prevented by using titanium or a titanium alloy as the material to be welded. In addition, the friction welding is a solid-phase welding, and it is possible to suppress the deterioration of the mechanical properties of the welding portion which is remarkably observed in the general fusion welding. The thermal conductivity of pure titanium is as low as 17 1 W m·K and the thermal conductivity of titanium alloys (Ti-6A1-4V) is as low as 7 5 W m·K, so that the frictional welding process can be suitably used.

Further, in the friction welding method of the present invention, it is preferable that the welding temperature in the case where the material to be welded is titanium or a titanium alloy is set to be equal to or lower than the β transus temperature of the titanium or the titanium alloy. By setting the welding temperature to be equal to or lower than the β transus temperature of titanium or a titanium alloy, the structure of the welded portion can be made fine equiaxed grains, and a welded portion having both high strength and toughness can be formed.

In the friction welding method of the present invention, the welding temperature can be controlled by setting the pressure at the time of the friction welding to be equal to or higher than the yield stress of one member and/or the other member at a desired welding temperature and equal to or lower than the tensile strength. And, the non-uniformity of the temperature at the welding interface can be suppressed by applying a sufficient welding temperature to the center portion of the interface to be welded in the second step. However, for example, in the case where it is difficult to secure the uniformity of the temperature distribution at the welding interface when different materials are welded each other, it is preferable to forcibly cool the welding region from the outside.

Since the temperature distribution of the welding interface and the positional dependence of the plastic deformation behavior become more remarkable in case that different material are welded, it is necessary to suppress them in order to obtain a good joint. Here, since the peripheral speed of the outer peripheral portion of the member to be welded is increased, the temperature during welding tends to be higher than that of the center portion, and the temperature distribution in the radial direction can be made uniform by forcibly cooling the outer peripheral portion. The forced cooling method is not particularly limited as long as the effect of the present invention is not impaired, and the cooling method can be carried out by blowing air, supplying liquid nitrogen, liquid $CO_2$, or the like, but it is preferable to inject a liquid $CO_2$ having a high cooling efficiency.

In order to uniformly distribute the temperatures in the radial directions of the welding interface, it is preferable to reduce the rotational velocity of the material to be welded and to set the pressure ($P_1$) at the time of friction welding to be high. By combining the conditions and forced cooling, for example, even when one member is made of stainless steel and the other member is made of a titanium alloy, a different-material joint having high joint efficiency can be obtained.

In addition, the present invention provides, a welded structure having a welded portion of two metal materials, wherein at least one of the metal materials is a high-speed tool steel, the prior austenite crystal grains of the high-speed tool steel at the welding interface of the joint are equiaxed grains, a region having crystal grain boundaries caused by the prior austenite crystal grains are distributed at substantially constant intervals around the welding interface, the hardness in the vicinity of the welding interface is less than 500 HV, and substantially all regions of the welding interface are metallurgically welded.

The welded structure of the present invention has a welded portion made of one high-speed steel, but in addition to suppressing an excessive increase in hardness of the welded portion, since there is no unwelded portion, the welded structure is extremely reliable. The welded structure of the present invention can be suitably produced by the friction welding method of the present invention.

In the welded structure of the present invention, the prior austenite crystal grains of the high-speed tool steel at the welded interface of the welded portion are equiaxed grains, and regions having crystal grain boundaries caused by the prior austenite crystal grains are distributed at substantially constant intervals around the welded interface. The fact that the prior austenite crystal grains are equiaxed grains means that the austenite grains are recrystallized during the welding process.

Furthermore, the present invention provides, a welded structure having a welded portion of two metal materials, at least one of the metal materials is a high-speed tool steel, the welding interface of the welding portion mainly consists of recrystallized grains, a region having the recrystallized grains are distributed at substantially constant intervals around the welding interface, the hardness in the vicinity of the welding interface is less than 500 HV, and substantially all regions of the welding interface are metallurgically welded.

The welded structure of the present invention has a welded portion made of one high-speed steel, but in addition to suppressing an excessive increase in hardness of the welded portion, since there is no unwelded portion, the welded structure is extremely reliable. In other words, even when one of them is a JIS-SKH51 which is commonly used as a cutting tool, it is possible to obtain a good welded structure in which no unwelded portion exists. The welded structure of the present invention can be suitably produced by the friction welding method of the present invention.

In the welded structure of the present invention, the welding interface is formed mainly from recrystallized grains. Since the structure in the vicinity of the welding interface is a recrystallized grain of fine equiaxes, a welding portion excellent in mechanical properties such as strength, toughness, reliability, and the like can be obtained. Here, the recrystallized grains are formed by plastic deformation and heating of the welded material made of metal, and are one of the major features of the friction welding method of the present invention. Further, in the friction welding method of the present invention, there is an effect that the recrystallization temperature is lowered by introducing a strong processing strain in the vicinity of the welding interface, and welding at a low temperature is realized. On the other hand, in the conventional friction welding method, the welding temperature becomes high, so that a transformation structure is mainly formed in the vicinity of the welding interface of the iron-based material.

EFFECT OF THE INVENTION

According to the present invention, it is possible to provide a friction welding method capable of reducing the welding temperature in addition to accurately controlling the welding temperature, and a friction welding method capable of obtaining a welded portion without defects regardless of the type of the material to be welded, and a welded structure obtained by the friction welding method.

DETAILED DESCRIPTION OF THE INVENTION

Figure 1:
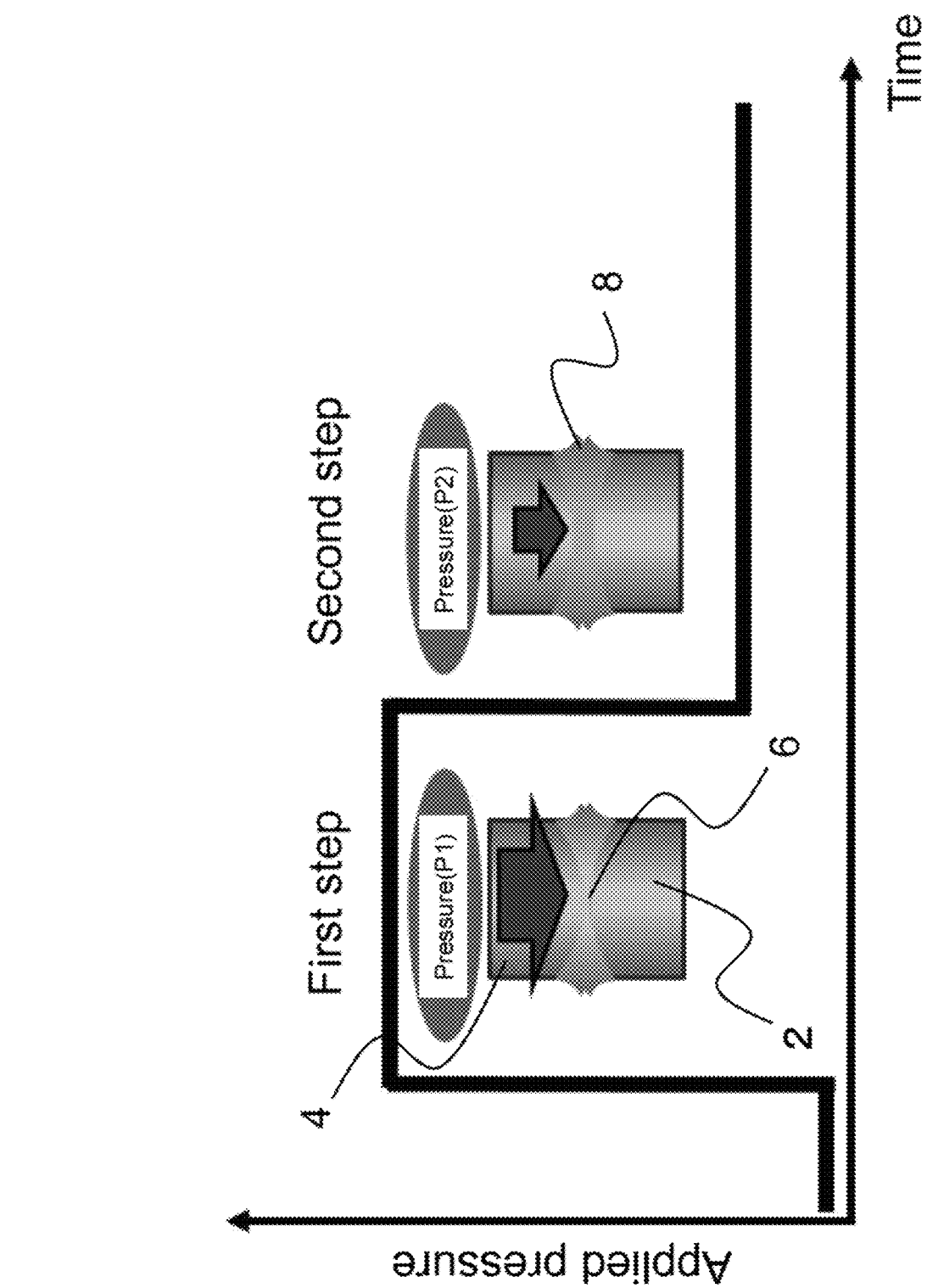
FIG. 1 is a schematic view showing the welding process of the friction welding method of the present invention.

Hereinafter, the friction welding method of the present invention and a typical embodiment of a joint structure obtained thereby will be described in detail with reference to the drawings, but the present invention is not limited thereto. In the following description, the same or corresponding components are denoted by the same reference numerals, and a repetitive description may be omitted. In addition, since the drawings are for conceptually explaining the present invention, the dimensions and ratios of the components shown in the drawings may differ from actual ones.

FIG. 1 is a schematic view showing a welding process of the friction welding according to the present invention. The friction welding method of the present invention is a friction welding method in which one member 2 is brought into contact with the other member 4 and rotationally slid while a load is applied substantially perpendicularly to the interface 6 to be welded, wherein the friction welding method of the present invention includes a first step in which the friction welding is carried out by setting the area of the interface 6 to be welded and the pressure ($P_1$) calculated from the load to be equal to or higher than the yield stress and the tensile strength of the member 2 and/or the other member 4 at a desired welding temperature, and a second step in which the load is lowered to perform the friction welding continuously. Hereinafter, each step will be described in detail.

(1-1) First Step

The first step is a step in which one member 2 is brought into contact with the other member 4 and is rotationally slid while a load is applied substantially perpendicularly to the interface 6 to be welded, and in this step, friction welding is carried out by setting the area of the interface 6 to be welded and the pressure ($P_1$) calculated from the load to be equal to or higher than the yield stress and lower than the tensile strength of the one member 2 and/or the other member 4 at desired welding temperatures.

Here, only one of the member 2 and the other member 4 may be rotated, or both may be rotated. Alternatively, one member 2 may be rotated before being brought into contact with the other member 4, or may be rotated after forming the interface 6 to be welded.

The material of the one member 2 and the other member 4 is not particularly limited as long as the effect of the present invention is not impaired, and the material may have a metallic phase which can be welded by friction welding, but it is preferable that the material is an iron-based metal, titanium, or a titanium alloy, and it is more preferable that the material is a high-speed tool steel. Since the iron-based metal, titanium, or a titanium alloy has mechanical properties that can withstand the welding process of friction welding, deformation or the like at an unnecessary place during the welding process can be prevented by using these metals as the material to be welded. In addition, the friction welding is a solid-phase welding, and it is possible to suppress the deterioration of the mechanical properties of the welding portion, which is remarkably observed in general fusion welding. Further, even in the case of high-speed steel or a titanium alloy having a large plastic deformation resistance and a low thermal conductivity, by uniformizing the temperature distribution of the interface to be welded in the second step, it is possible to form a good welded portion in which no unwelded portion exists.

The shape and size of the one member 2 and the other member 4 are not particularly limited as long as the effect of the present invention is not impaired, and the shape and size of the member to be welded can be set to the shape and size of the member to be welded by friction welding known in the art.

Under a situation in which pressures ($P_1$) are applied almost vertically to the welding surface 6, one member 2 and the other member 4, by rolling and moving on the same trajectory, burrs 8 are discharged from the welding surface 6. Here, in the friction welding, the welding temperature can be controlled by setting the pressure ($P_1$) at the time of the friction welding to be equal to or higher than the yield stress of one member 2 and/or the other member 4 and equal to or lower than the tensile strength at a desired welding temperature. Here, the discharge of the flash 8 from the welded interface 6 is started by setting the pressure ($P_1$) to be equal to or higher than the yield stress of the welded material, and the discharge of the burr 8 is accelerated by increasing the pressure ($P_1$) up to the tensile strength. Like the yield stress, since the tensile strength at a ($P_1$) temperature is also substantially constant depending on the material to be welded, the welding temperature corresponding to the set pressure P can be realized.

Figure 2:
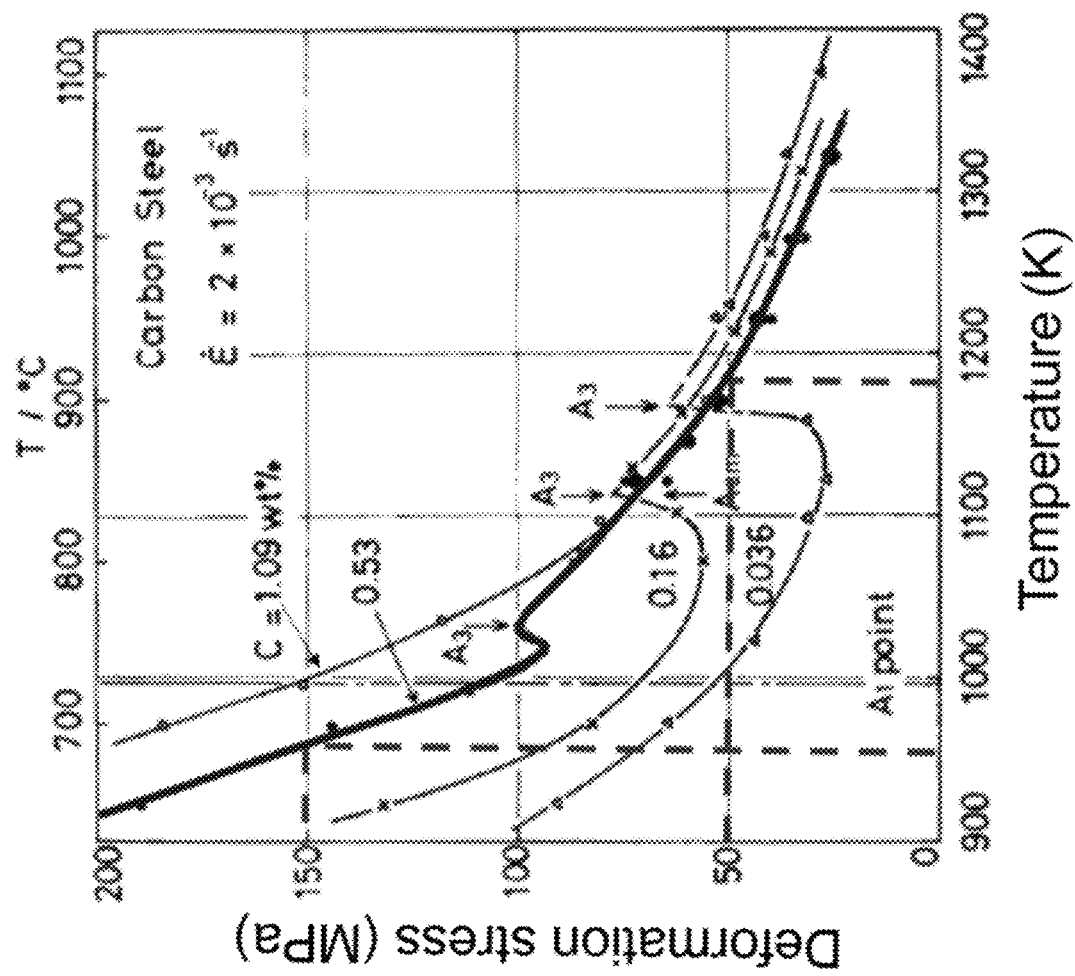
FIG. 2 is a graph showing the deformation stress (yield stress) of carbon steel at each temperature.
Figure 3:
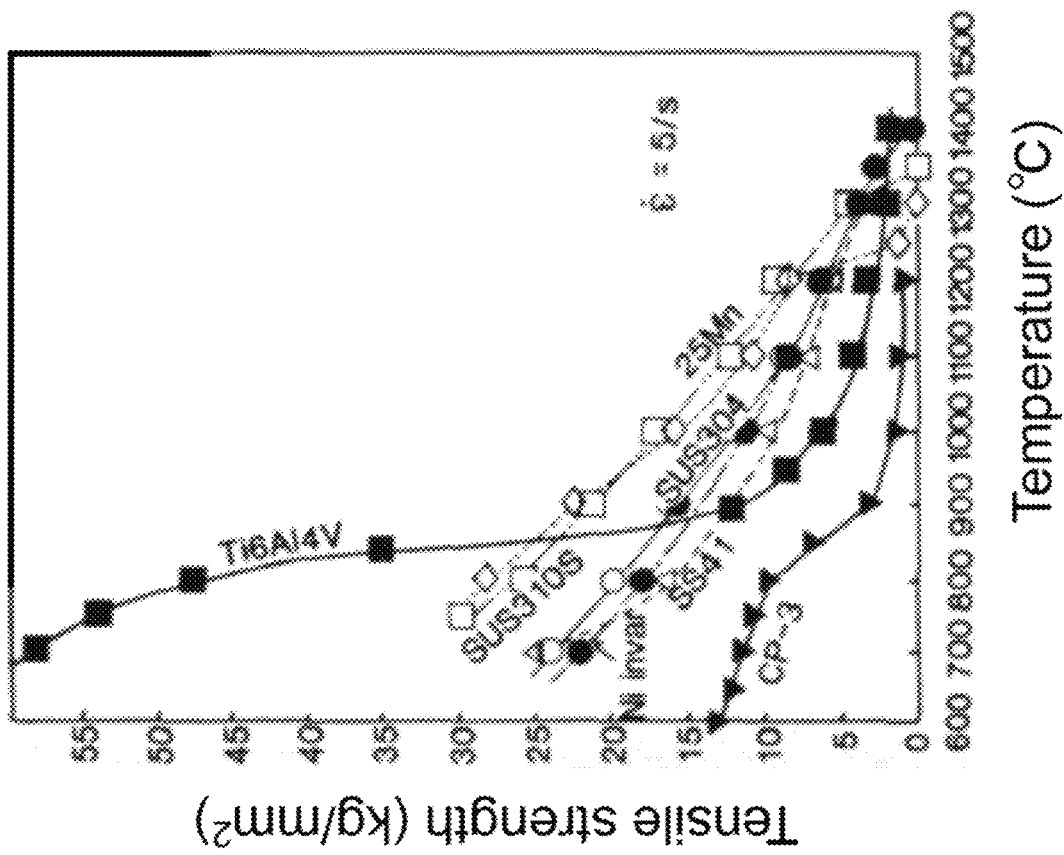
FIG. 3 is a graph showing the tensile strength of various metals at various temperatures.

As a specific example, the deformation stress (yield stress) of carbon steel at each temperature is shown in FIG. 2, and the tensile strength of various metals at each temperature is shown in FIG. 3. FIG. 2 is a graph published in "Iron and Steel, No. 11, 67 (1981), p. 140", and FIG. 3 is a graph published in "Iron and Steel, No. 6, 72 (1986), p. 55". As shown in these Fig.s, the tensile strength and yield stress at a particular temperature are approximately constant for different materials.

That is, when the ($P_1$) P at the time of welding is set high, the material to be welded having higher yield strength and tensile strength can be discharged as a flash, and the welding temperature can be lowered. Also, as shown in FIGS. 2 and 3, since the tensile strength and the yield stress at a specific temperature are substantially constant depending on the material, the welding temperature can be controlled very accurately.

In order to control the welding ($P_1$) more accurately, it is preferable to set the pressure P to the yield stress of one member and/or the other member at the desired welding temperature. In the frictional welding, the discharge of the flash 8 is started at the moment when the pressure ($P_1$) reaches the yield stress, and the welding temperature can be more accurately defined as compared with the case where the pressure ($P_1$) is set to a higher value (with the tensile strength as an upper limit).

In other words, the ($P_1$) rise caused by the frictional heat lowers the yield stress of the welded material, and the discharge of the flash is started at the instant when the yield stress becomes lower than the pressure P. Here, the temperature increasing speed is increased by increasing the rotation speed at which the material to be welded slides, but the maximum reaching temperature (welding temperature) is not changed.

In friction welding, welding parameters other than the pressure ($P_1$) (rotational speeds, welding times, allowances, and the like of the members to be welded) need to be set, but these values are not limited as long as the effects of the present invention are not impaired and may be appropriately set depending on the materials, shapes, sizes, and the like of the members to be welded.

When the one member 2 and/or the other member 4 is made of an iron-based metal, it is preferable to set the welding temperature to a temperature equal to or lower than the $A_1$ temperature of the iron-based metal used as the material to be welded. In iron-based metals, brittle martensite is formed by phase transformation, and there are cases in which welding is difficult and in which a welding portion is embrittled. On the other hand, by setting the welding temperature to the $A_1$ temperature or lower by the friction welding method of the present invention, phase transformation does not occur, and therefore, the friable martensite can be completely suppressed from being formed. The $A_1$ point (° C.) of the iron-based material can be known, for example, from "A1=750 8-26.6 C+17.6Si-11.6Mn-22.9Cu-23Ni+ 24.1Cr+22.5Mo-39 7V-5.7Ti+232.4Nb-169.4Al-894. 7B" (C, Si, etc. are substituted by weight %).

When one member 2 and/or the other member 4 is made of titanium or a titanium alloy, it is preferable that the welding temperature be equal to or lower than the β transus temperature of titanium or a titanium alloy. By setting the welding temperature to be equal to or lower than the β transus temperature of titanium or a titanium alloy, the structure of the welded portion can be made fine equiaxed grains, and a welded portion having both high strength and toughness can be formed.

(1-2) Second Step

The second step is a step that is continuous with the first step, and the welding temperature in the entire area of the interface 6 to be welded, particularly in the center portion of the interface 6 to be welded, can be made uniform in the second step, and the formation of an unwelded portion can be effectively suppressed. In the friction welding, the peripheral speed increases on the outer peripheral side of the member to be welded, and the amount of friction heat generation increases as compared with the center portion. As a result, softening progresses in the vicinity of the outer periphery of the interface to be welded, and it becomes difficult to support the applied load. That is, the area of the interface 6 to be welded supporting the load is reduced, and the pressure actually applied to the center portion of the interface 6 to be welded is higher than the set value ($P_1$). As described above, since the increase of the applied pressure lowers the welding temperature, in particular, when the desired welding temperature is low, when the deformation resistance of the material to be welded (2, 4) is large, and when the heat conduction at the interface to be welded 6 does not proceed quickly, an unwelded portion is formed due to the welding temperature of the center portion of the welding interface 6 being too low.

On the other hand, by reducing the load applied to the interface 6 to be welded in the second step, the welding temperature can be increased. By raising the temperature of the central portion of the interface 6 to be welded by the second step to such an extent that welding is possible, it is possible to obtain a good friction-welded joint in which no unwelded portion exists. In general frictional welding, the applied pressure is increased in the final step of welding, but in the friction welding method of the present invention, it is possible to realize uniformity of the welding temperature at the interface to be welded by passing through completely different (reversed) steps.

In the friction welding process, in the second step, it is preferable to calculate the true pressure ($P_2$) by subtracting the softened region of the interface 6 to be welded due to an increase in temperature from the area, and reduce the load so that the pressure ($P_1$) and the true pressure ($P_2$) become substantially the same value.

The softened region means a region in which plastic deformation is caused by the pressure ($P_1$) in the temperature distribution of the interface 6 to be welded at the time of shifting from the first step to the second step. The softened region can be determined by observing the state of the interface 6 to be welded after the first step, but when the determination of the softened region by observing the interface 6 to be welded is omitted, the softened region is preferably 10 to 50% of the area of the interface 6 to be welded, more preferably 15 to 20%. By calculating the true pressure ($P_2$) by setting the softened region to 10 to 50% of the area of the interface 6 to be welded, it is possible to effectively suppress the formation of an unwelded portion in the center portion of the interface 6 to be welded.

The timing of shifting from the first step to the second step may be appropriately determined according to the material, shape, size, and the like of the material to be welded, but the defect suppressing effect can be sufficiently exhibited only by executing the second step for about several seconds.

(B) Welded Structure

Figure 4:
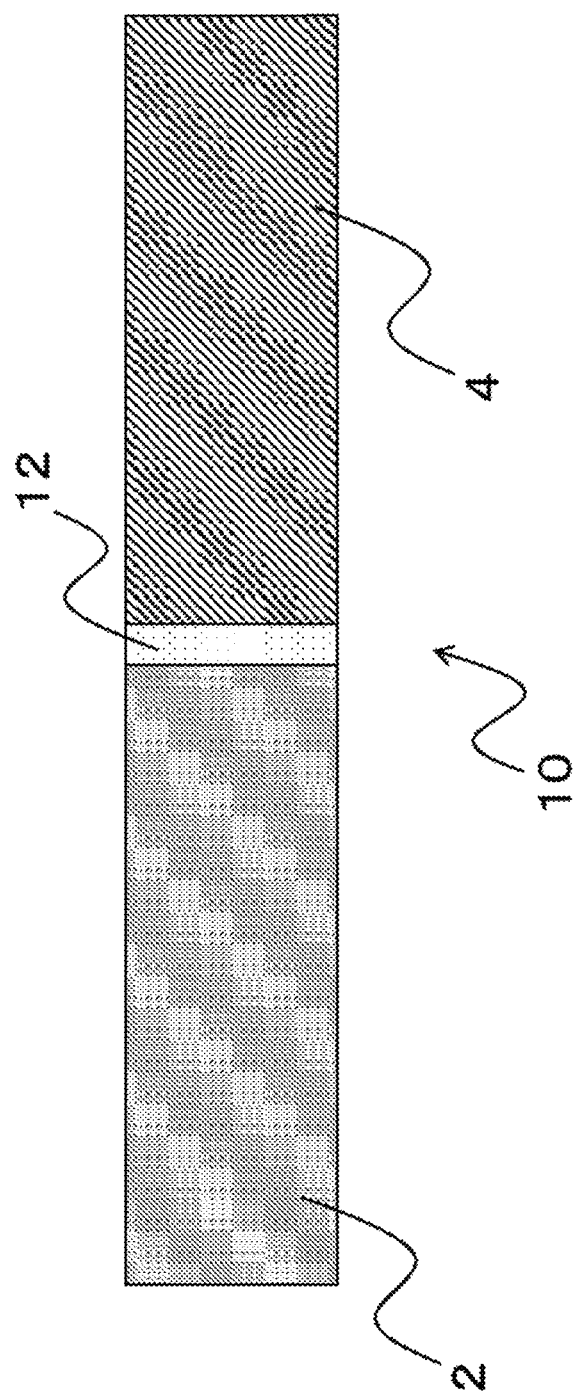
FIG. 4 is a schematic view showing a welding portion in the welded structure of the present invention.

FIG. 4 is a schematic view showing a welding portion in the welded structure of the present invention. The welded portion 10 is formed by welding the material to be welded 2 and the material to be welded 4, and the material to be welded 2 and/or the material to be welded 4 is high-speed tool steel. The welded structure of the present invention can be suitably produced by the friction welding method of the present invention, and FIG. 4 shows a welded portion welded by the friction welding method of the present invention.

The welded portion 10 is not formed with a significant heat affected zone HAZ, and is an extremely reliable welded structure having a high joint efficiency. The welding interface 12 is mainly formed of recrystallized grains, and the structure in the vicinity of the welding interface 12 becomes microcrystallized grains of fine equiaxes, so that the welding portion 10 has high mechanical properties such as strength, toughness, reliability, and the like.

Here, the recrystallization grains are formed by a decrease in recrystallization temperature due to plastic deformation of the material to be welded 2 and/or the material to be welded 4, and are one of the major features of the friction welding method of the present invention. On the other hand, in the conventional frictional welding method, the welding temperature is increased, so that a transformation structure including martensite is formed in the vicinity of the welding interface 12 of the tool steel.

Further, in the welded structure of the present invention, the formation of martensite is suppressed, so that the hardness in the vicinity of the welding interface 12 is less than 500 HV. In addition, an unwelded portion does not exist at the welding interface 12, and an extremely good welded portion 10 is formed.

Although the friction welding method of the present invention and the representative embodiment of the welded structure obtained thereby have been described above, the present invention is not limited to these methods, and various design modifications are possible, and all of these design modifications are included in the technical scope of the present invention.

EXAMPLE

Example 1

Figure 5:
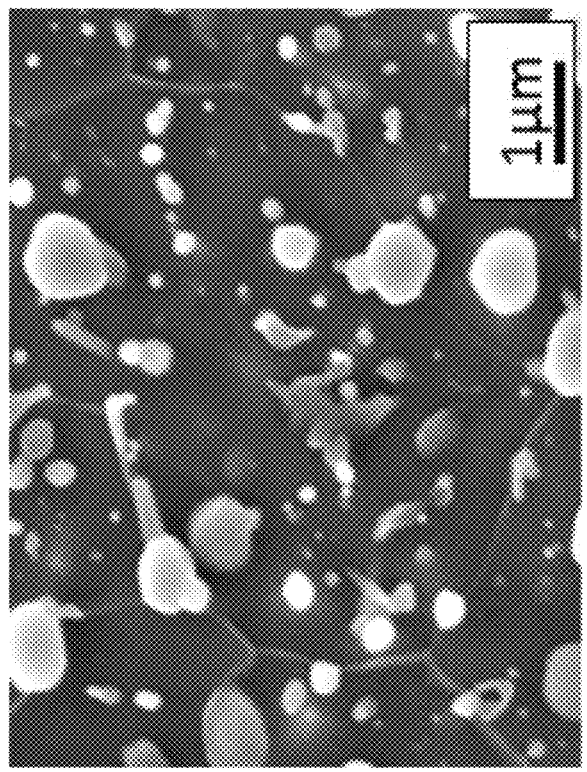
FIG. 5 is a photograph of the structure of the material to be welded.

High-speed tool steels with diameters of 10 mm and lengths of 90 mm: JIS-SKH51 (0.89% C-0.27% Si-0. 28% Mn-0. 020% P-0.001% S-3.90% Cr-6. 10% W-5.05% Mo-1. 84% V-Bal.Fe) round rods were used as the materials to be welded, and friction welding of the round rods was carried out using a friction welding machine manufactured by Nitto Seiki Co., Ltd. As shown in FIG. 5, the structure of the material to be welded is a tempered martensite and a spherical carbide.

The friction welding conditions were as follows: the first step was carried out at a rotational speed of 100 rpm, a welding pressure of 360 MPa, and a side margin of 2 mm; and the second step was carried out at a rotational speed of 100 rpm, a welding pressure of 300 MPa, and a side margin of 1 mm. The friction welding was carried out by frictional length control, and the second step was carried out continuously at the time point when the margin reached 2 mm from the first step.

Figure 6:
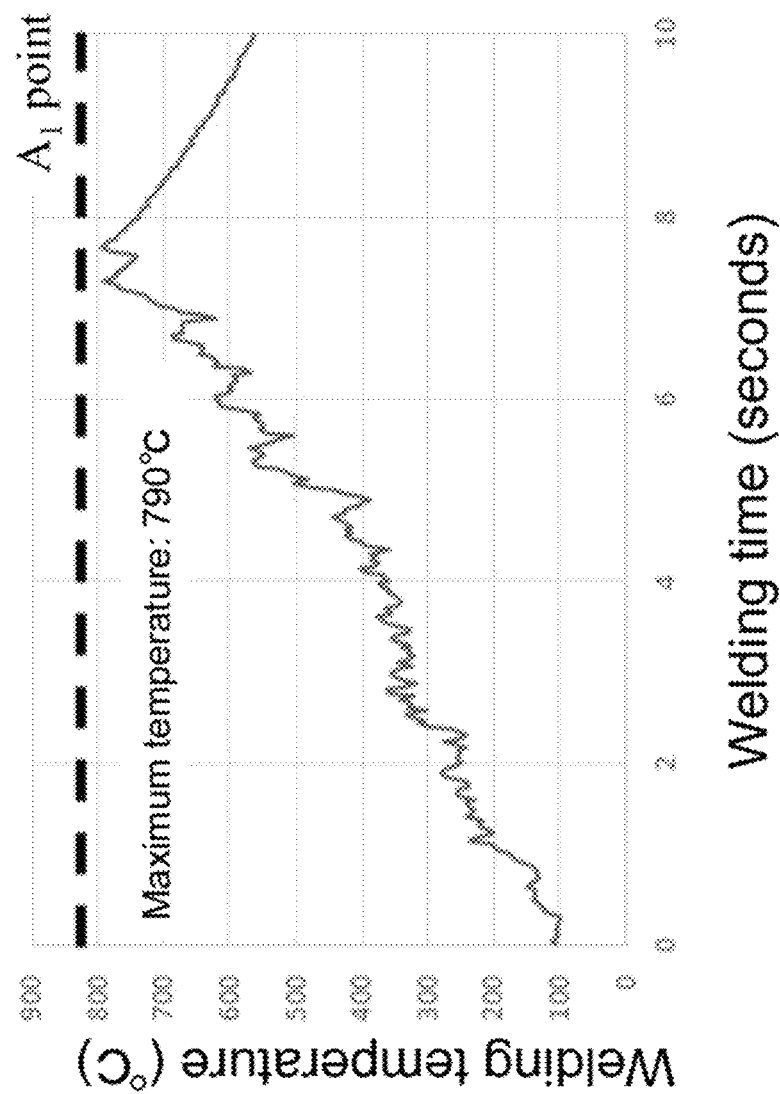
FIG. 6 is a graph showing changes in welding temperature during friction welding in Example 1.

The change in welding temperature during friction welding is shown in FIG. 6. Thermal imaging cameras (CPA-T640, manufactured by CINO) were used to measure the temperature of the sides of the welding interface to be welded. As shown in FIG. 6, the maximum attained temperature during friction welding is 790° C., which indicates that the maximum attained temperature is less than or equal to the $A_1$ temperature of the material to be welded.

Figure 7:
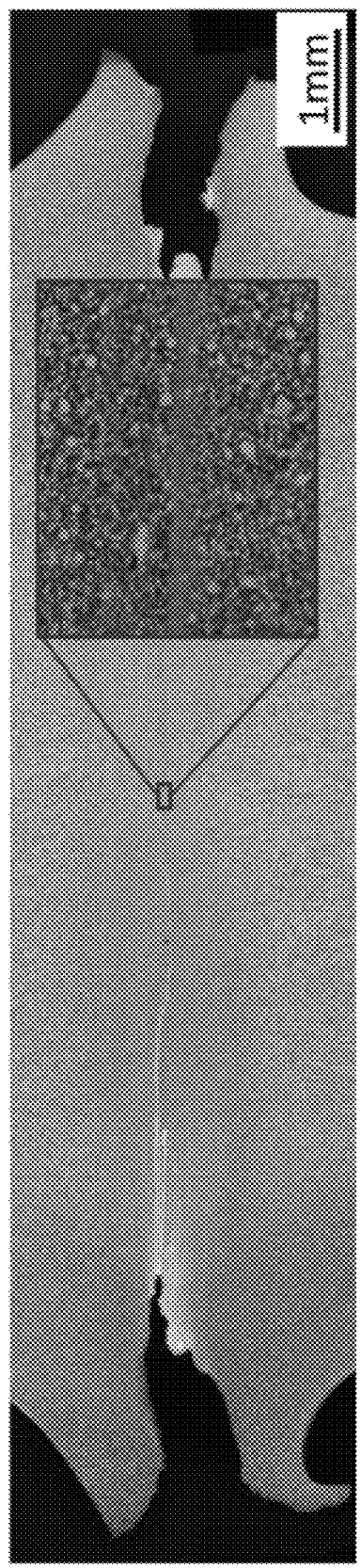
FIG. 7 is a macrophotograph of a longitudinal section including a welding center of the joint obtained in Example 1.

FIG. 7 shows a macrophotograph of a longitudinal section including the center of the welded portion of the obtained joint. It can be confirmed that an unwelded portion is not formed at the center of the welded portion, and a good welded portion without defects is obtained. Although a region having white contrast exists at the outer periphery of the welding interface, the region is metallurgically welded and is not a defect.

Figure 8:
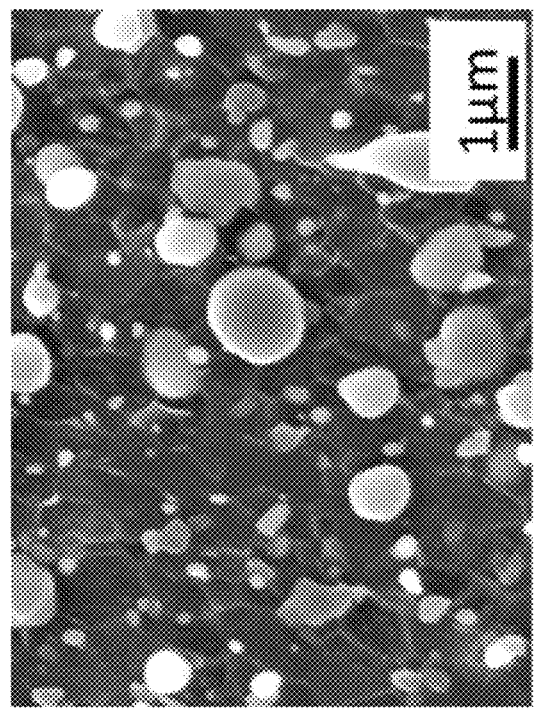
FIG. 8 is an organizational photograph of the center of the welding interface in FIG. 7.
Figure 9:
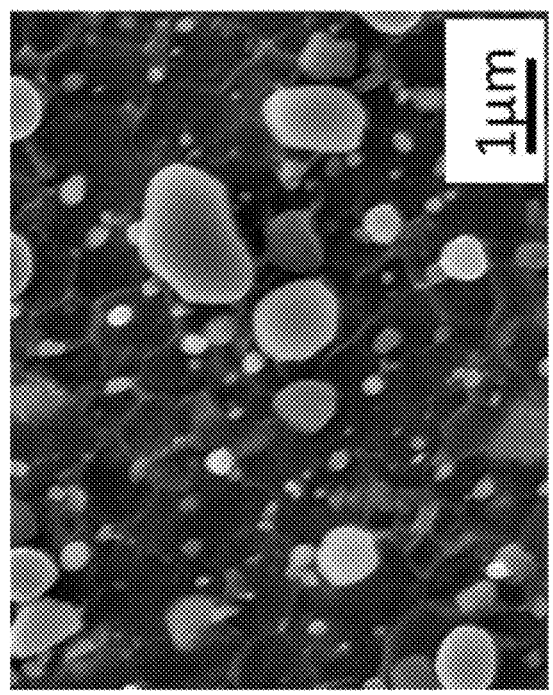
FIG. 9 is a photograph of the structure of the side surface of the welding interface in FIG. 7.

Photographs of the structure of the center and the side surface of the welding interface in FIG. 7 are shown in FIGS. 8 and 9, respectively. Both of these structures are composed of microstructurally fine ferrites and spherical carbides, and it is understood that the welding temperatures are suppressed below the $A_1$ temperature in the whole area of the interface to be welded.

Figure 10:
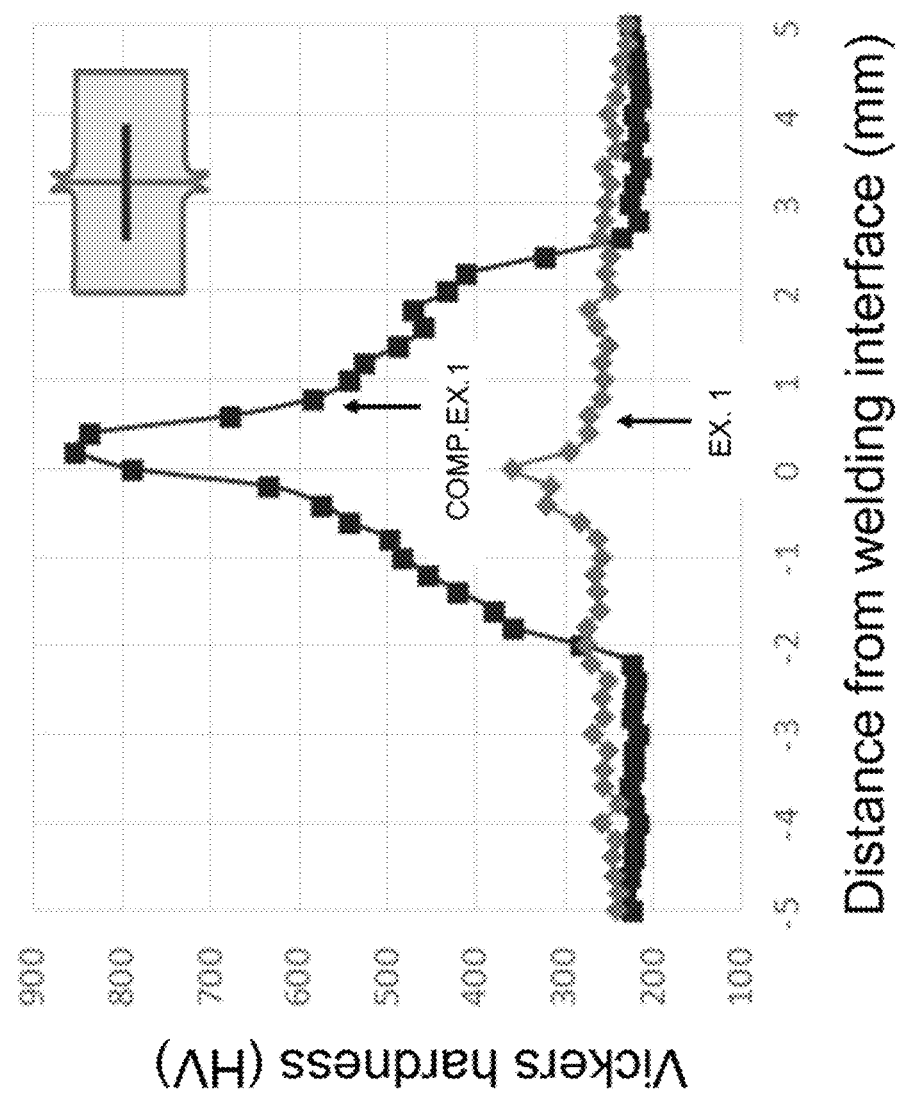
FIG. 10 is a hardness distribution of the joint portion obtained in Example 1.

The hardness distribution of the welded portion is shown in FIG. 10. The hardness measurement was carried out in a direction perpendicular to the center of the welded portion with respect to the cross section of the joint shown in FIG. 7. The hardness in the vicinity of the welding interface is slightly increased by the refinement of the structure, but remains at about 350 HV because the formation of martensite is suppressed.

Figure 11:
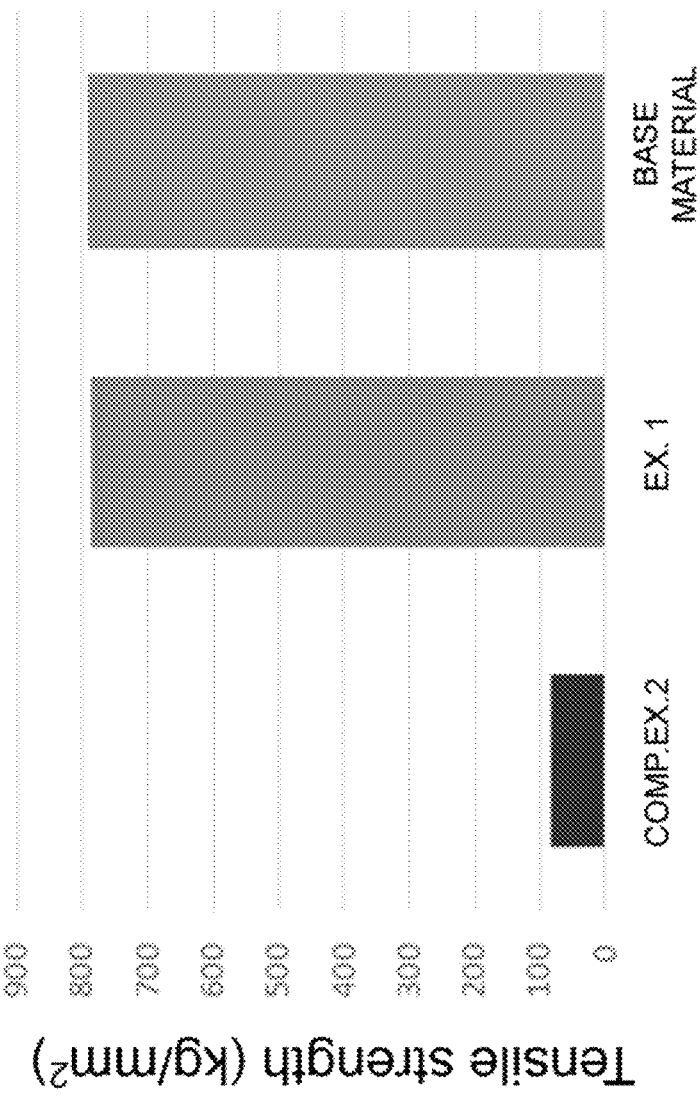
FIG. 11 is a graph showing the tensile strength of the joints obtained in Example 1 and Comparative Example 2.

The tensile strength of the obtained joint is shown in FIG. 11. Since a good welded portion without defects is formed, the joint has a tensile strength substantially equal to that of the base material, and the joint efficiency is about 100%.

Example 2

Figure 12:
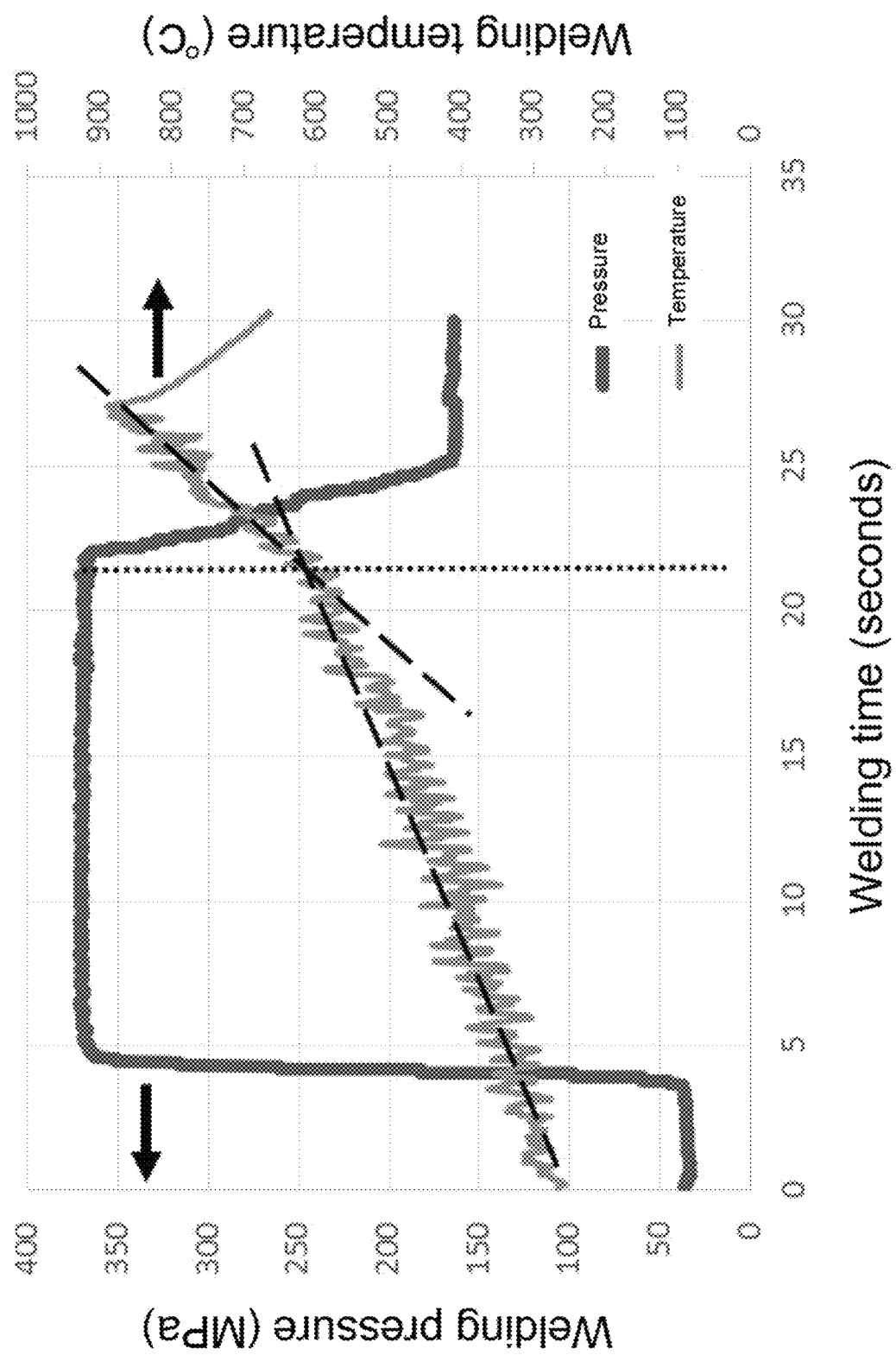
FIG. 12 is a graph showing changes in welding pressure and welding temperature during friction welding in Example 2.

Friction welding was carried out in the same manner as in Example 1 except that the welding pressure in the second step was 180 MPa. FIG. 12 shows changes in the welding pressure and the welding temperature at the time of the friction welding. It can be seen that the welding temperature rises along with the transition from the first step (welding pressure 360 MPa) to the second step (welding pressure 180 MPa), and the welding temperature changes depending on the welding pressure (the welding temperature rises when the welding pressure is lowered).

Comparative Example 1

Figure 13:
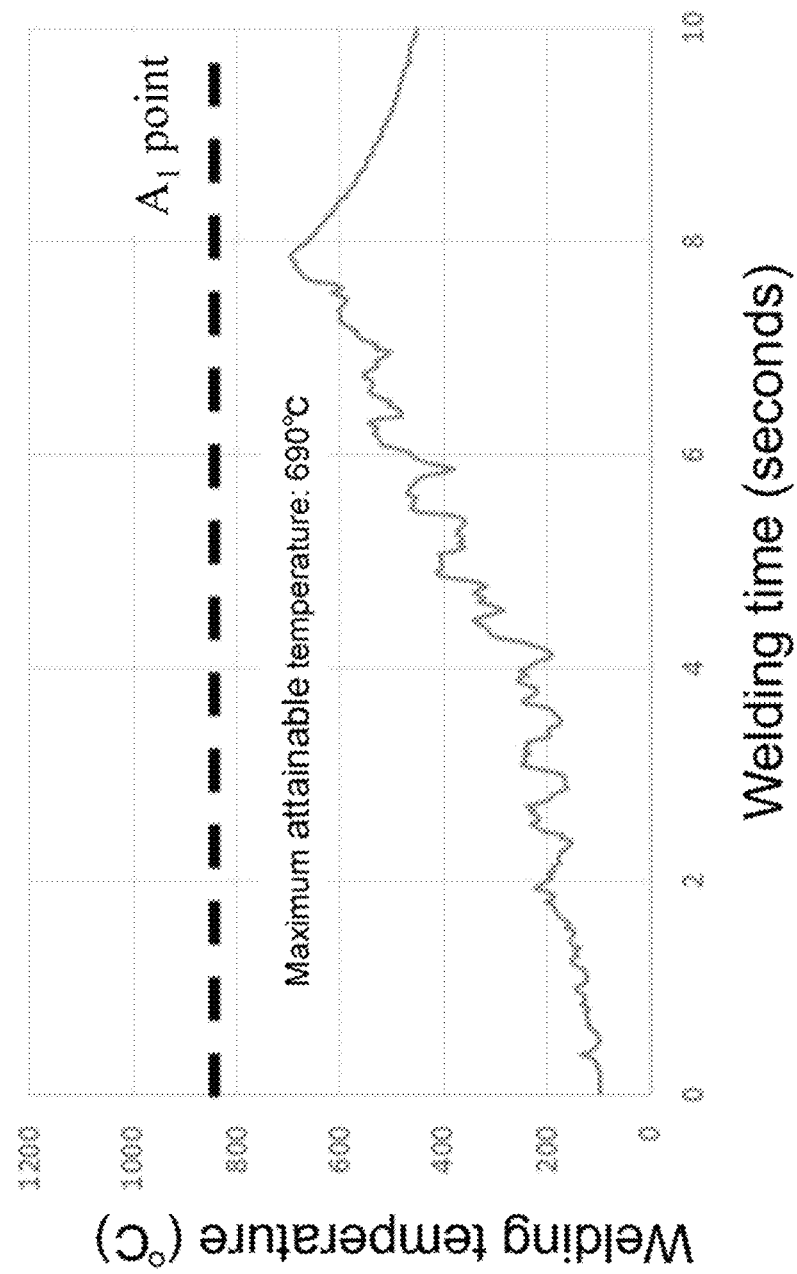
FIG. 13 is a graph showing a change in welding temperature during friction welding in Comparative Example 1.

Friction welding was carried out in the same manner as in Example 1 except that the margin of the first step was 3 mm and the second step was not carried out. The change in welding temperature during friction welding is shown in FIG. 13. It is understood that the maximum reaching temperature is 690° C., and the welding temperature is lower than or equal to the $A_1$ temperature of the material to be welded.

Figure 14:
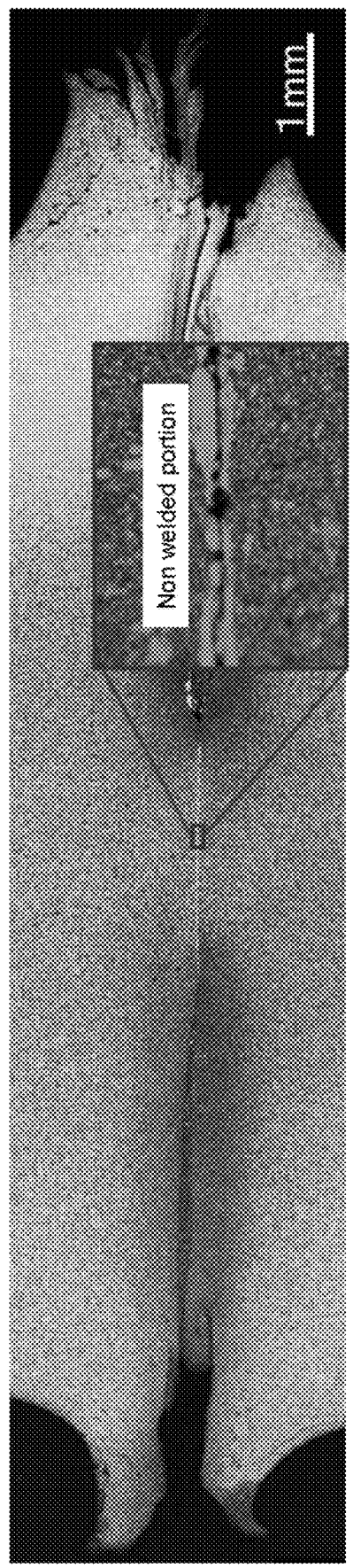
FIG. 14 is a macrophotograph of the joint obtained in Comparative Example 1 in a longitudinal section including the center of the joint.
Figure 15:
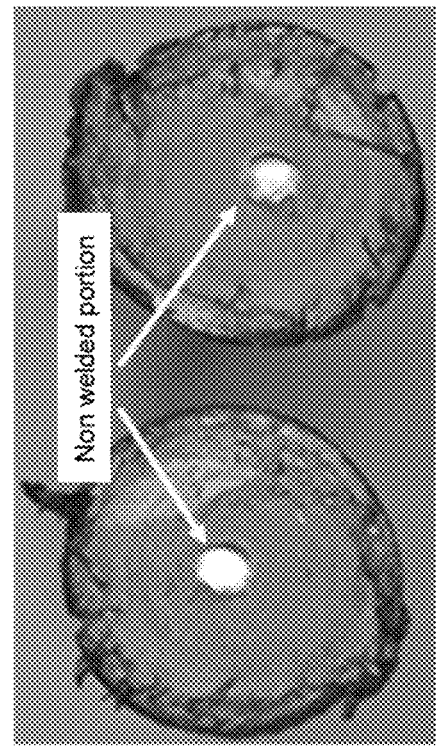
FIG. 15 is a fracture surface of the joint obtained in Comparative Example 1.

FIG. 14 shows a macrophotograph of a longitudinal section including the center of the welded portion of the obtained joint. An enlarged photograph of the center of the welded portion is also shown, but it can be confirmed that an unwelded portion exists at the center of the welded portion. It can be confirmed that an unwelded portion exists at the center of the welded portion even in the fractured surface of the welded portion shown in FIG. 15.

Comparative Example 2

Figure 16:
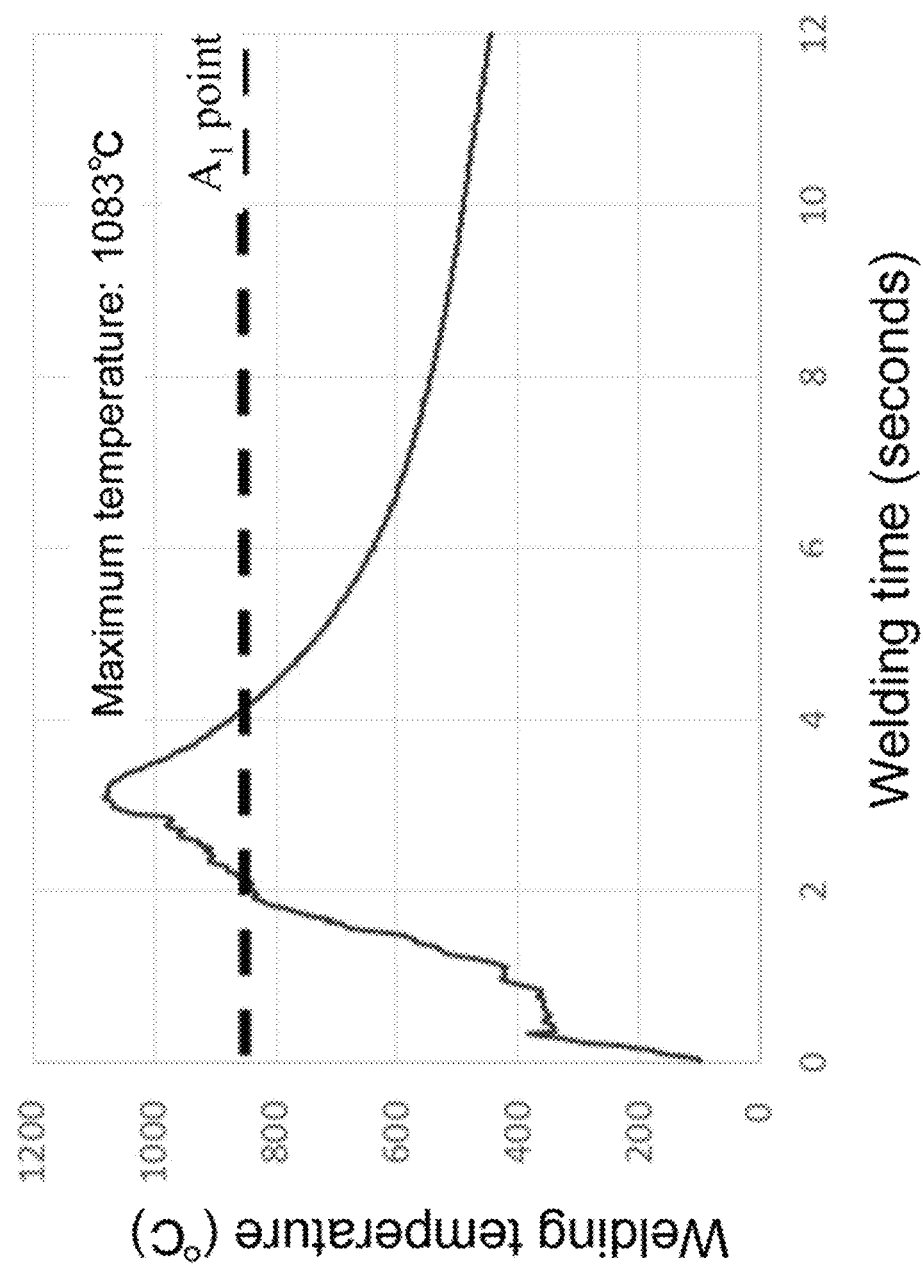
FIG. 16 is a graph showing the change in welding temperature during friction welding in Comparative Example 2.

Friction welding was carried out in the same manner as in Example 1 except that the first step was carried out at a rotational speed of 200 rpm, a welding pressure of 240 MPa, and a margin of 2 mm, and the second step was not carried out. The change in welding temperature during friction welding is shown in FIG. 16. It is understood that the maximum reaching temperature is 1083° C., and the welding temperature is equal to or higher than the $A_1$ temperature of the material to be welded. In addition, from the result, it can be confirmed that the welding temperature is increased by decreasing the welding pressure.

Figure 17:
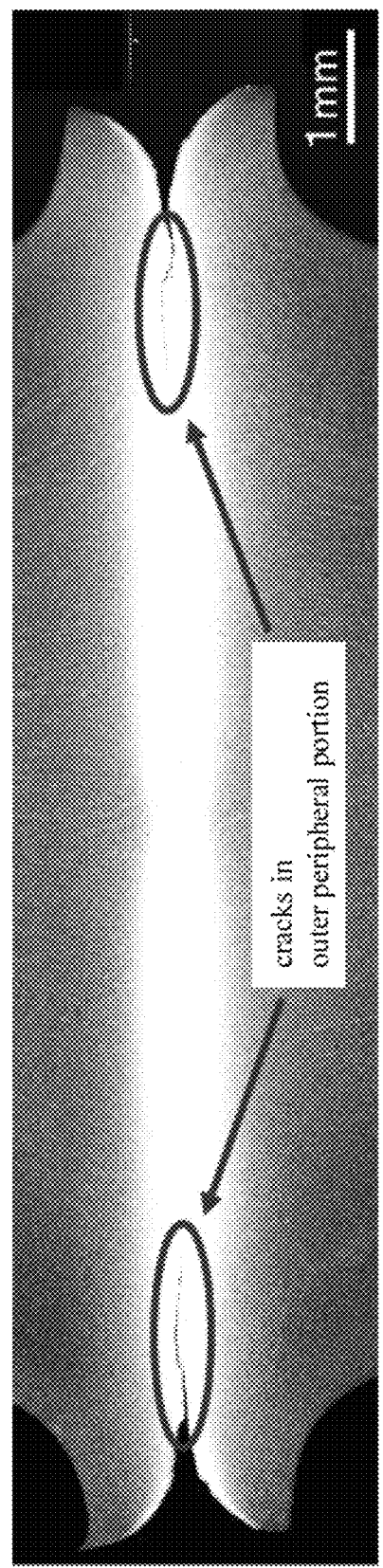
FIG. 17 is a macrophotograph of the joint obtained in Comparative Example 2 in a longitudinal section including the center of the joint.

FIG. 17 shows a macrophotograph of a longitudinal section including the center of the welded portion of the obtained joint. Although the welding temperature is high and the formation of an unwelded portion is not observed even at the center of the welding portion, cracks are generated in the outer peripheral portion. The cracks are due to embrittlement due to the formation of martensite.

Figure 18:
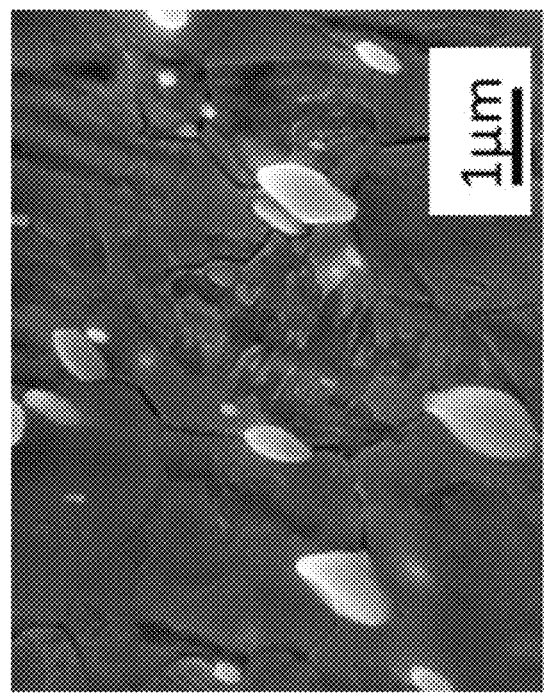
FIG. 18 is an organizational photograph of the center of the welding interface in FIG. 17.
Figure 19:
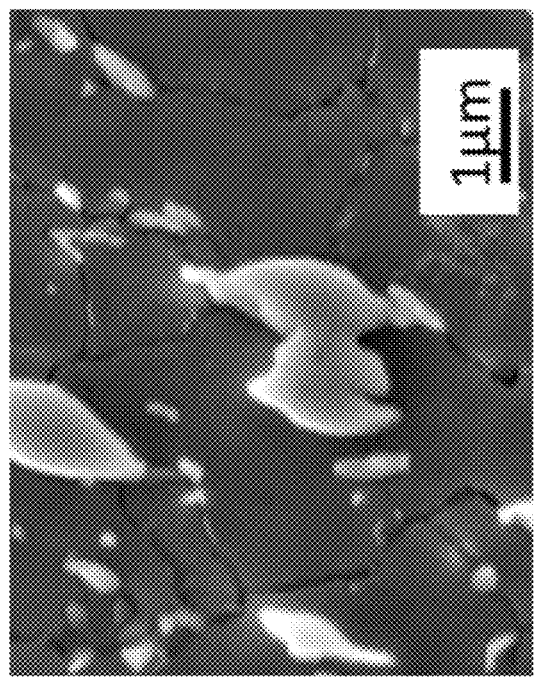
FIG. 19 is a photograph of the structure of the side surface of the welding interface in FIG. 17.

Photographs of the structure of the center and the side surface of the welding interface in FIG. 17 are shown in FIGS. 18 and 19, respectively. Both of these structures are composed of martensite and spherical carbides, and it is understood that the welding temperatures are higher than the A₁ temperature in the whole area of the interface to be welded.

The hardness distribution of the welded portion is shown in FIG. 10. The hardness measurement was carried out in a direction perpendicular to the center of the welded portion with respect to the cross section of the joint shown in FIG. 17. The formation of martensite indicates that the hardness in the vicinity of the welding interface reaches 850 HV.

The tensile strength of the obtained joint is shown in FIG. 11. The tensile strength is extremely low due to the embrittlement caused by martensite formation and is less than 100 MPa.

EXPLANATION OF NUMERALS 2,4 . . . materials to be welded,
6 . . . welding interface
8 . . . flash.
10 . . . welded portion,
12 . . . welding interface.

The invention claimed is:

1. A friction welding method, in which one member is brought into contact with other member and slides in a state that a load is applied perpendicularly to an interface to be welded, comprising:
   a first step of carrying out friction welding by setting a pressure ($P_1$) calculated from an area of the interface to be welded and the load to be equal to or higher than a yield stress of the one member and/or the other member and equal to or lower than a tensile strength of the one member and/or the other member at a desired welding temperature, and
   a second step of carrying out friction welding by lowering the load,
   wherein the first step and the second step are carried out continuously.

2. The friction welding method in accordance with claim 1, wherein, in the second step, a true pressure ($P_2$) is calculated by subtracting a softening area of the interface to be welded caused by an increase in temperature from the area, and the load is reduced so that the pressure ($P_1$) and the true pressure ($P_2$) are the same value.

3. The friction welding method in accordance with claim 2, wherein a softening region is set to 10 to 50% of the area.

4. The friction welding method in accordance with claim 1, wherein the pressure ($P_1$) is set to the yield stress of the one member and/or the other member at the desired welding temperature.

5. The friction welding method in accordance with claim 1, wherein one member and/or the other member is made of an iron-based metal.

6. The friction welding method in accordance with claim 1, wherein the welding temperatures is set to be below the A₁ temperature of the ferrous metals.

7. The friction welding method in accordance with claim 5, wherein the iron-based metal is a high-speed tool steel.

8. A welded structure having a welded portion of two metal materials, wherein
   at least one of the metal materials is a high-speed tool steel,
   prior austenite crystal grains of the high-speed tool steel at the welding interface of the welded portion are equiaxed grains,
   regions having crystal grain boundaries caused by the prior austenite crystal grains are distributed at constant intervals around the welding interface,
   a hardness within 5 mm of the welding interface is less than 500 HV, and
   all regions of the welding interface are metallurgically welded,
   wherein the prior austenite crystal grains are equiaxed grains, the austenite grains are recrystallized during the welding process.

9. A welded structure having a welded portion of two metal materials, wherein
   at least one of the metal materials is a high-speed tool steel,
   the welding interface of the welded portion mainly consists of recrystallized grains,
   regions having the recrystallized grains are distributed at constant intervals around the welding interface,
   a hardness within 5 mm of the welding interface is less than 500 HV, and
   all regions of the welding interface are metallurgically welded.

10. The welded structure in accordance with claim 8, wherein the high-speed tool steels are JIS-SKH51.

* * * * *